UNITED STATES PATENT OFFICE.

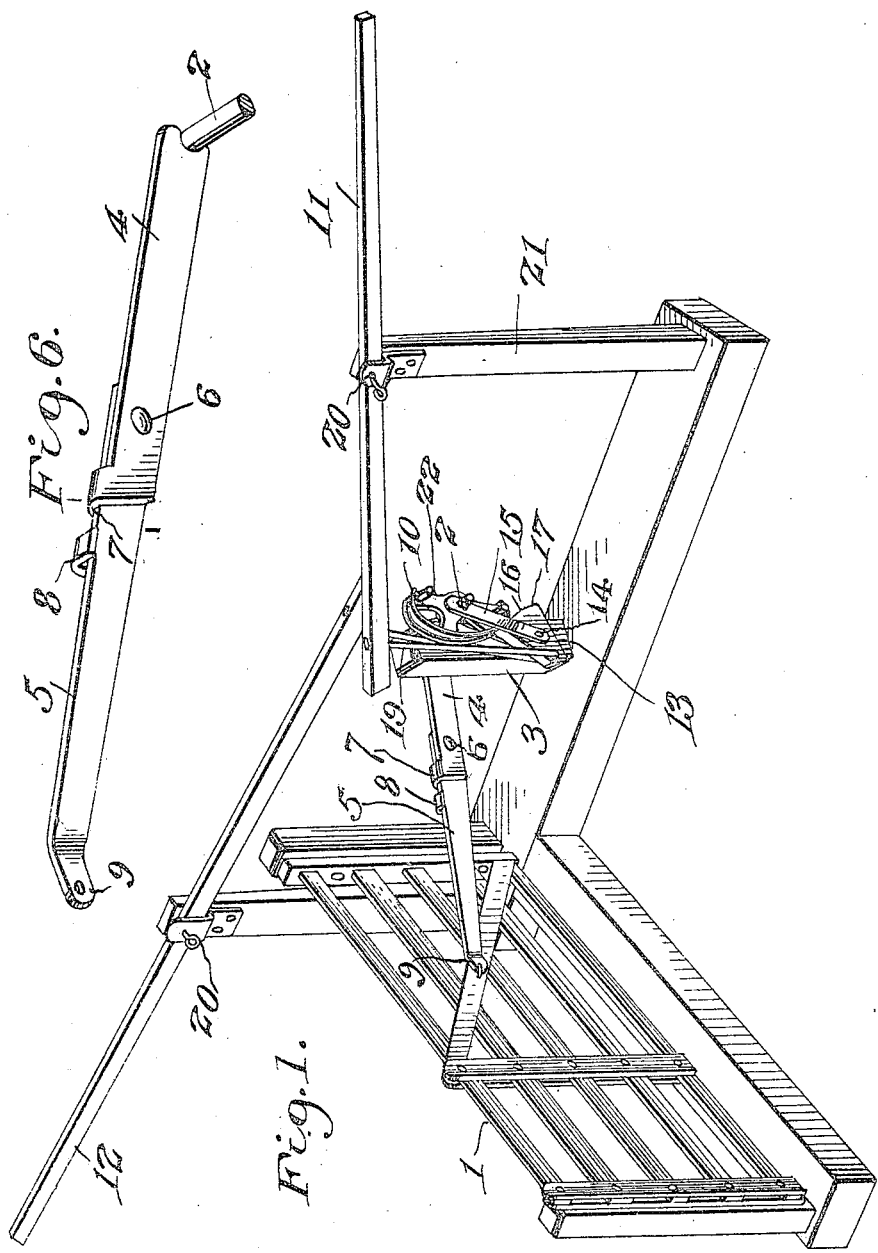

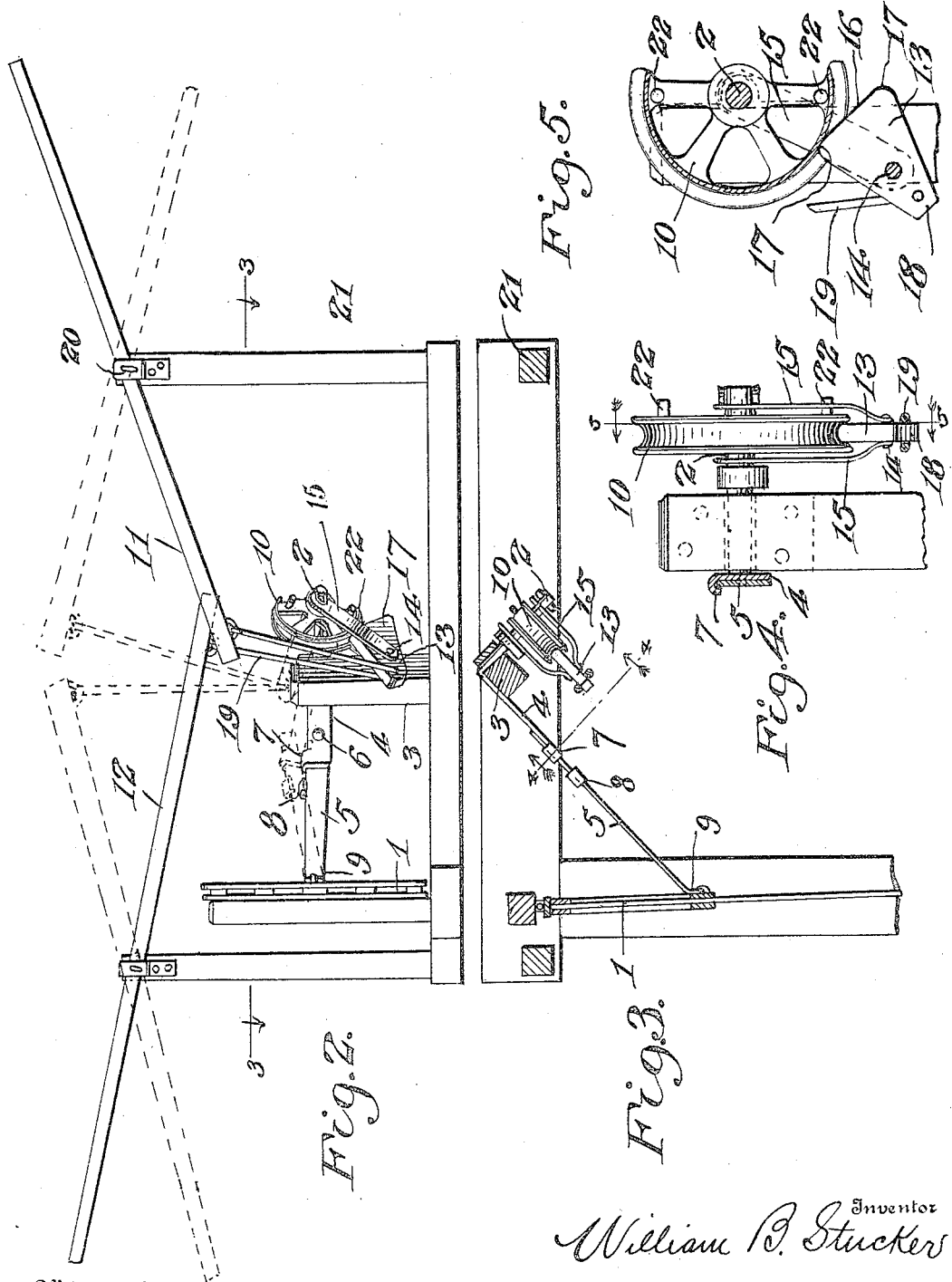

WILLIAM BIGLER STUCKER, OF ATALISSA, IOWA.

GATE-OPERATING DEVICE.

949,919.   Specification of Letters Patent.   Patented Feb. 22, 1910.

Application filed July 19, 1909. Serial No. 508,479.

*To all whom it may concern:*

Be it known that I, WILLIAM B. STUCKER, a citizen of the United States, residing at Atalissa, in the county of Muscatine and State of Iowa, have invented certain new and useful Improvements in Gate-Operating Devices, of which the following is a specification, reference being had to the accompanying drawings.

This invention relates to improvements in devices for opening and closing farm or road gates and other swinging closures.

The object of the invention is to provide a simple and practical closure operating device of this character which will be practically without dead centers so that when operated the gate will be moved either to its full open or closed position and which may be easily operated at distances from the gate or other closure.

With the above object in view, the invention consists principally in an improved clutch device for operating a crank shaft which has an operative connection with the gate or closure.

The invention consists further in the novel features of construction and the combination and arrangement of parts hereinafter fully described and claimed, and illustrated in the accompanying drawings, in which—

Figure 1 is a perspective view of the improved gate opening and closing device; Fig 2 is a side elevation; Fig. 3 is a detail horizontal section taken on the plane indicated by the line 3—3 in Fig. 2; Fig. 4 is a detail vertical section taken on the plane indicated by the line 4—4 in Fig. 3; Fig. 5 is a detail vertical section taken on the plane indicated by the line 5—5 in Fig. 4; and Fig. 6 is a detail perspective view of a portion of the rock shaft showing its crank arm and link connection for the gate.

My invention may be used for operating a swinging closure of any description but, as illustrated in the drawings, I have applied it to a horizontally swinging farm or road gate 1.

The invention comprises a rock shaft 2 which is disposed horizontally and mounted for rotary movement and also for a limited lateral movement in a suitable bearing on a post 3 or any other suport. An operative connection is provided between said shaft and the gate or closure 1, such connection consisting, preferably, of a crank arm 4 fixed to said shaft and having loosely pivoted to its outer end a link 5, which latter is in turn pivotally connected to the gate at a suitable distance from its hinge or pivot.

As illustrated, the arm 4 has the pivot 6 for the link 5 located a suitable distance from the extremity of said arm and working in an elongated opening in the link 5. A laterally projecting hook-shaped stop 7 on the upper edge of the arm 4 is adapted to engage the upper edge of the link 5 to prevent said link and arm from dropping below a horizontal plane. A similar stop 8 is provided on the link 5 and adapted to engage the arm 4 when the latter is swung over on the opposite side of the pivot or shaft 2. Owing to this construction, it will be noted that the weight of the arm 4 and link 5 will tend to swing the gate to either its open or closed position according to which side of the vertical plane of the pivot or shaft 2 said arm 4 is disposed upon. It will also be noted that the longitudinal axis of the shaft 2 is disposed at an angle to the longitudinal plane of the gate 1 when the latter is in its closed position in order that little power will be necessary to move the gate. The pivotal connection between the link 5 and the gate is preferably effected by providing said link with an angular apertured end, which latter is engaged with a staple or eye 9 on the gate to provide a loose pivotal connection.

Fixed to the shaft 2 is a segmental member 10 which forms a part of a clutch device adapted to be actuated by one or more levers 11, 12 or any other operating means. Said clutch also comprises a pivoted dog 13 in the form of a substantially triangular-shaped weight block pivoted at 14 between two links 15 which swing from the rock shaft 2. One edge 16 of said dog 13 is opposed to the curved edge or periphery of the segmental member 10 and it is preferably disposed in a groove or channel formed in said member. The length of the links 15 is such that when the dog 13 is swung on its pivot 14 in either direction, either of the two ends 17 of said dog will bind the grooved periphery of the segmental member 10 so that the two will be locked together for simultaneous movement. The short or pointed outer end 18 of the dog, which end is opposed to the edge 16, is connected by two links 19 to the levers 11, 12, which latter are pivoted intermediate their ends at 20 on posts 21 or other suitable supports and their free ends may form handles or to them may be attached any suitable operating devices. To limit the movement of the links 15, stop pins 22 are provided at diametrically opposite points on one side of the segmental member 10 for engagement by said links.

In operation, assuming the gate to be in its closed position shown in Fig. 1, when the free end of either one of the levers 11, 12 is pulled downwardly the other end of such lever will cause the attached link 19 to swing the dog 13 upwardly and, owing to the engagement of one of the ends 17 with the segmental member 10 on the rock shaft, these parts will be locked together so that the shaft 2 will be turned. When said shaft is thus rocked the arm 4 swings upwardly and in so doing draws upon the link 5 to cause the latter to swing the gate 1 open. As the arm 4 passes the vertical plane of its axis or shaft 2, the weight of said arm and also of the link 5 will rock the shaft 2 still farther in the same direction, thereby swinging the gate to its full open position. As the rock shaft continues in its swinging movement, one of the stop pins 22 engages one of the links 15 when the dog 13 releases the segmental member 10 and causes said links and dogs to swing over upon the other side of the shaft, the dog being simultaneously reversed so that when one of the levers 11, 12 is again actuated the parts will operate in a similar manner to close the gate. It will be noted that the distance between the pivots 2 and 14 is less than the sum of the distances between the pivot 2 and the periphery of the segmental member 10, and between the pivot 14 and the center of the edge 16 of the dog 13. Owing to this peculiar construction of the reversible or double acting toggle link clutch connection, it will be seen that when the links 15, 19 and dog 13 are raised to the limit of their upward movement by depressing the hand levers, and the latter are released, the dog must necessarily fall to either side of the vertical plane of the pivot 2 and drop into operative engagement with the segmental member 10. It will be further noted that the weight of the parts of this toggle link clutch connection will tend to swing the shaft 2 in either direction and thereby prevent the arm 4 from remaining in a perpendicular position or at a dead center, consequently the gate will be maintained in either its full open or full closed position according to which side of the pivot 2 the arm 4 drops.

It will be noted that the further advantage of applicant's reversible clutch mechanism lies in the extra angle of the effective pull which the clutch feature permits. In applicant's clutch device the relative position of the clutch link and the operating arm is not fixed, allowing the dog and links to take an angle with the vertical greater than 90° on both sides of the pivot. This permits the gate to be swung open or closed to nearly its full extent before the dead center is reached and the effective pull ceases, requiring only the last movement to be completed by the weight and inertia of the operating parts.

While I have shown and described in detail the preferred embodiment of my invention, I wish it understood that I do not limit myself to the construction set forth since various changes in the form, proportion and arrangement of parts and in the details of construction may be resorted to within the spirit and scope of the invention.

Having thus described the invention what is claimed is:

1. The combination of a swinging closure, a rock shaft, operative connections between the latter and said closure, an operating means, and a reversible toggle link clutch connection between said rock shaft and said operating means.

2. The combination of a swinging closure, a rock shaft, operative connections between the latter and said closure, a movable operating member, a segmental member fixed to said rock shaft, links loosely mounted on said rock shaft and disposed on opposite sides of said segmental member, a triangular-shaped dog having its intermediate portion pivoted between the outer ends of said links, and a connection between one angle of said dog and said operating member, the side of the dog opposite said angle being adapted to have either of its ends frictionally engage said segmental member, whereby said dog is reversible.

3. The combination of a swinging closure, a rock shaft, a crank arm on the latter, a loose link connection between said arm and said closure, an operating lever, a segmental member fixed to said rock shaft, a pair of links loosely mounted on the rock shaft and disposed on opposite sides of said segmental member, a triangular-shaped dog having its intermediate portion pivoted between said links, a link connecting said lever to one angle of said dog, the side of the dog opposite said angle being adapted to have either of its ends frictionally engage said segmental member, whereby said dog is reversible, and stop projections at opposite points on the segmental member and adapted to be engaged by the links on said rock shaft.

4. The combination of a horizontally swinging gate, a post, a horizontal rock shaft journaled in a bearing on said post, a crank arm on one end of said shaft and provided at its extremity with a lateral stop projection, a link having loose pivotal connection with said arm and said gate and provided intermediate its end with a lateral stop projection, a semicircular-shaped segmental member fixed concentrically on said rock shaft and provided with a grooved edge, oppositely arranged stop pins projecting laterally from one side of said segmental member, a pair of links loosely mounted on said shaft and disposed on opposite sides of said segmental member and adapted to be limited in their movement by said stop pins, a triangular-shaped dog having its intermediate portion pivoted between said links, a pair of hand levers pivoted intermediate their ends, and a pair of links connecting said hand levers to one angle of said dog, the side of said dog opposite said angle being adapted to have either of its ends frictionally engage the grooved edge of the segmental member, whereby said dog is reversible.

In testimony whereof I hereunto affix my signature in the presence of two witnesses.

WILLIAM BIGLER STUCKER.

Witnesses:
JACOB VAUBLE,
JOHN H. SELMIER.